United States Patent Office 3,236,891
Patented Feb. 22, 1966

3,236,891
NITROPHENYLENEDIAMINE DERIVATIVES
John Robert Seemuller, Maisons-Laffitte, France, assignor to Société Anonyme dite: L'Oreal, Paris, France, a corporation of France
No Drawing. Filed Apr. 12, 1961, Ser. No. 102,364
Claims priority, application France, Nov. 29, 1955, 703,577
7 Claims. (Cl. 260—570.5)

The present invention relates to new nitro-aromatic compounds and their use in dyeing, particularly for dyeing animal fibres and more especially dyeing live hair.

This application is a continuation-in-part of prior application Serial No. 624,227, filed November 26, 1956, now abandoned.

Many dyestuffs of the type containing an aromatic nucleus having one or more substituted or unsubstituted amino groups and/or a number of nitro groups have been employed for dyeing animal fibres. The conditions which must be satisfied in dyeing live hair, which include dyeing at a temperature which can be withstood by the subject, minimum toxicity, and effective application to grey, white or bleached hair, considerably limit the number of dyes which can be so used.

There have already been described and proposed for such a use nitro aromatic diamines such as, for example nitro p-phenylenediamines in which the amino group meta to the nitro group, is mono-substituted by a mono- or poly-hydroxy-alkyl group. However, compounds of this type in which the substituent on the amino group is a hydroxy methyl radical, have inadequate stability even when the hydroxyl group is esterfied with an inorganic acid. The same holds true when the hydroxy-alkyl radical is heavier, for example, hydroxyethyl or hydroxy-isopropyl.

Introducing hydroxyl groups in these compounds, as well as esterifying these groups with an inorganic polybasic acid aims at increasing the water-solubility of the dyes, which are otherwise sparingly soluble.

It is an object of this invention to provide stable nitro phenylene diamine compounds which are particularly suitable for dyeing animal fibres, and more especially live hair, at moderate temperatures. It is a further object to provide compositions containing such compounds. The nitro, ortho and para-phenylenediamine, in which the nitro group is in a meta position to one of the amino groups, and in which the amino group remote from the nitro is a group which has the general formula $$NR_1—(CH_2)_{m-n}—(CO)_n—NR_2R_3$$

in which $R_1$, $R_2$ and $R_3$ each represent an atom of hydrogen or an alkyl radical having from one to 3 atoms of carbon, $m$ represents an integer between 2 and 3 and $n$ is equal to 0 or 1.

According to a further feature of the invention a composition for application to the hair for dyeing same comprises an alkaline solution of a compound as just defined.

According to a still further feature of the invention a method of dyeing animal fibres and more particularly live hair comprises applying thereto an alkaline solution of a compound as just defined.

The following examples will serve to illustrate the invention but are not to be regarded as limiting it in any way:

EXAMPLE 1.—1-AMINO-2-NITRO-4-β-AMINOETHYLAMINO-BENZENE

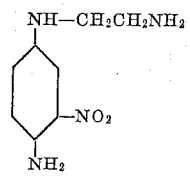

p-Nitrochlorobenzene is first condensed with ethylene diamine. The nitro derivative obtained is reduced to beta aminoethyl p-phenylene diamine which is thereafter acetylated. The triacetyl derivative obtained is nitrated, and then deacetylated in order to obtain the desired compound.

The steps of this synthesis are represented below.

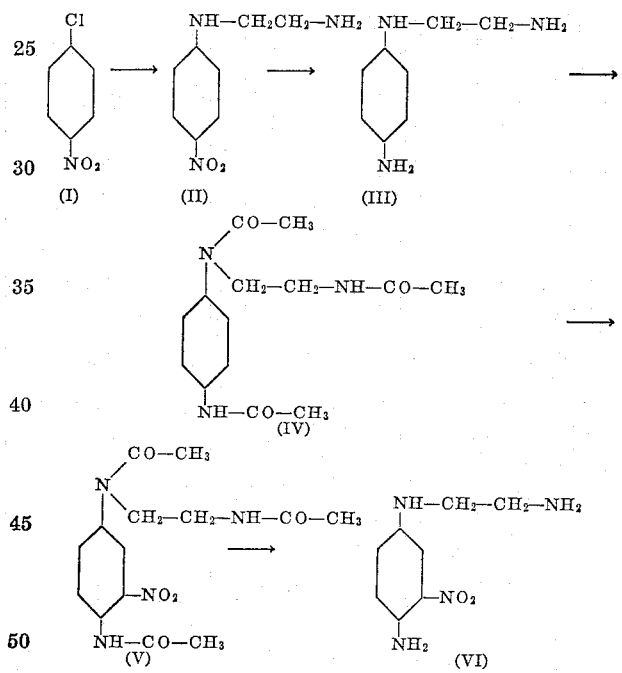

The method of operation followed and the characteristics of the compounds obtained are as follows:

The Compound II is prepared by the process of J. P. F. Fourneau and Madame Y. de Lestrange (Bull. Soc. Chim., 1947, page 834).

*Reduction of the Compound II to the Compound III*

300 g. of iron powder are introduced into 1200 ml. of water to which 10 ml. of glacial acetic acid have been added and the mixture is heated to 85–90° C. 181 g. (1 mol.) of Compound II are then gradually added, the temperature being maintained at 90° C. while 55 ml. of acetic acid are added in the course of the reduction. The reaction is complete within half an hour. The reaction product is made alkaline with 4 g. of sodium carbonate and filtered hot.

It is unnecessary to isolate Compound III in order to effect the acetylation.

*Acetylation of the Compound III to the Compound IV*

Immediately after the filtration, 425 g. of acetic anhydride are added to the filtrate at 90° C. with vigorous stirring and the mixture is heated for 1 hour at 80–90° C. After cooling, 500 g. of crushed ice are added and the mixture is neutralized with 550 ml. of 40% sodium hydroxide solution, care being taken that the temperature does not rise above 7° C. The triacetyl derivative IV is allowed to crystallize, filtered and dried at 65–70° C. It melts at 191° C. and the yield is 94%. After recrystallization, the melting point is 195–196° C.

Analysis:

| Element | Calculated, percent | Found, percent |
|---------|---------------------|----------------|
| C       | 60.64               | 60.24          |
| H       | 6.85                | 7.11           |
| N       | 15.16               | 15.15          |

*Nitration of the Compound IV*

84 g. of the Compound IV are dissolved in 500 ml. of concentrated sulphuric acid (66° Bé.) and the nitration is effected at 15° C. by pouring in a sulphuric nitric acid mixture consisting of 66 g. of nitric acid having a density of 1.38 and 66 g. of concentrated sulphuric acid, the temperature being maintained between 20° and 25° C. for 4½ hours. The product is poured onto crushed ice and neutralized with 40% aqueous sodium hydroxide solution, care being taken that the temperature does not rise above 40° C. The reaction mixture is extracted with ethyl acetate. The extract is then distilled to drive off the ethyl acetate and the residue is recrystallized from absolute alcohol.

35 g. of the Compound V are thus obtained in the form of lemon-yellow needles melting at 207–208° C.

*Deacetylation of the Compound V*

The Compound V is refluxed for an hour and a half with 200 ml. of 50% aqueous sulphuric acid. After cooling, 600 ml. of ethyl alcohol are added. The mixture is left overnight in a refrigerator, and the crystals formed are then filtered. The dark-colored viscous residue is warmed, filtered through bone-black and returned into the refrigerator. A further quantity of crystals is recovered. The sulphate of the compound of Formula VI is thus obtained in the form of yellow crystals which decompose at 185° C. The free base is very hygroscopic and it is preferred to use the sulphate.

*Dyeing.*—A 2% aqueous solution of 1-amino-2-nitro-4-β-aminoethylamino-benzene sulphate is prepared and made alkaline by adding a base, for example ammonia.

This solution is applied in the cold to live hair or similar fibres, and a beautiful dark violet shade is obtained. The addition of hydrogen peroxide does not shift the shade.

EXAMPLE 2.—1-NITRO-3-AMINO-4-β-AMINOETHYLAMINO-BENZENE

This product is obtained by condensation of ethylene diamine with 1,3-dinitro-4-chlorobenzene, which gives, 1,3-dinitro-4-β-aminoethylamino-benzene, which in turn gives the required compound when reduced with sodium hydrosulphide.

The steps of the synthesis are represented in the following:

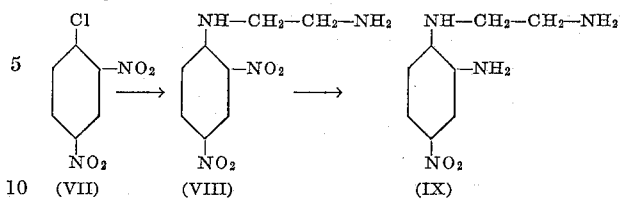

(VII)   (VIII)   (IX)

*Condensation.*—Into a round flask equipped with a reflux condenser are introduced 150 g. of 97% pure ethylene diamine and 9.5 g. of anhydrous cupric chloride. 0.6 mol. Compound VII is gradually added. The temperature rises to 85° C. and is maintained at this level for half an hour with heating. The solution is then poured into 2 litres of ice-cooled water. The precipitate formed is filtered, dissolved in 2 litres of water, filtered again, pasted with a little water and then filtered again.

After the last filtering, the precipitate is dissolved in 300 ml. of boiling ethyl alcohol and filtered, and 10% aqueous hydrochloric acid is added to the filtrate to form the hydrochloride, which melts at 233–235° C. Yield: 60%.

While the amine of Formula VIII hydrates readily, the hydrochloride prepared as indicated above keeps well. It is dissolved in 800 ml. of water, neutralized with 40% aqueous sodium hydroxide solution and the precipitated product is filtered and dried in a desiccator for 3 days. The free amine thus prepared melts at 84–85° C. Yield 80%.

*Controlled reduction.*—0.1 mol. of the Compound VIII is brought into suspension in 450 ml. of ethyl alcohol containing from 8% to 9% of $NH_3$ added. Hydrogen sulphide gas is then bubbled therethrough. Dissolution of the Compound VIII is complete within 15 minutes and the solution turns gradually orange, red and dark brown. The stream of gas is bubbled through for 6 hours at a temperature of between 30–40° C. The alcoholic solution is then evaporated to dryness under reduced pressure.

The residue is dissolved in 7% hot aqueous hydrochloric acid. The sulphur which has precipitated is filtered. The hydrochloride is then neutralized with 40% aqueous sodium hydroxide solution. The base precipitates upon cooling. On successive recrystallizations from water in the presence of bone-black, red flakes melting at 135–136° C. are obtained. Yield: 50%.

The base, Formula IX, is dried in a desiccator.

*Dyeing.*—A 1% solution of the Compound IX is prepared and made weakly alkaline, and this solution is applied in the cold to live hair. A golden shade is obtained, which is brighter than that obtained with nitro-o-phenylenediamine.

EXAMPLE 3.—1-AMINO-2-NITRO-4-N-ACETAMIDO-AMINO-BENZENE

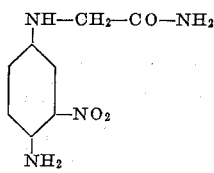

This compound is prepared by condensing chloroacetamide with nitro-p-phenylene diamine in accordance with the following scheme:

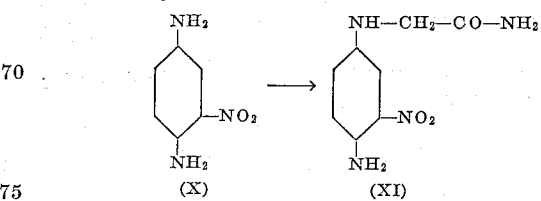

(X)   (XI)

*Line of proceeding.*—Into a round flask equipped with a mercury-sealed stirrer is introduced 0.8 mol. of nitro-p-phenylene diamine. 60 g. of calcium carbonate, 1 litre of hot water and 0.8 mol.+10% of chloroacetamide are added, the carbon dioxide evolved being collected in order to check the progress of the reaction. The reaction mixture is refluxed for 3½ hours, and is then filtered hot.

The resulting product is allowed to crystallize and is washed again with water. A compound melting at 183° C. is obtained. Yield: 60%.

After crystallization from water, a violet powder melting at 190° C. and pointing to Formula XI is obtained.
Analysis:

| Element | Calculated, percent | Found, percent |
|---|---|---|
| C | 45.71 | 45.64 |
| H | 4.76 | 4.87 |
| N | 26.66 | 26.89 |

*Dyeing.*—A 1% solution of 1-amino-2-nitro-4-N-acetamido-aminobenzene is prepared and made weakly alkaline with ammonia. This solution imparts a red tint to live or dead hair. The shade obtained is not sensitive to oxidizing agents such as, for example, hydrogen peroxide.

EXAMPLE 4.—1-N(BETA-DIETHYLAMINO-ETHYL) NITRO-3, DIAMINO-1,4 BENZENE

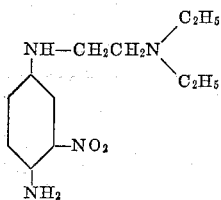

This product is prepared from nitroparaphenylene-diamine, by condensation with the hydrochloride or beta-diethyl amino-chloro-ethane, in the presence of calcium carbonate, in an aqueous medium, by refluxing.

A mixture of 15.3 grams (0.1 mole) of nitroparaphenylene-diamine, and 10 grams (0.1 mole) of calcium carbonate in 100 cc. of water, is heated to boiling for a period of 35 minutes, 19 grams (0.11 mole) of hydrochloride of beta-diethylamino-chloro-ethane dissolved in 55 cc. of water, is added drop by drop.

After the carbon dioxide has ceased to be released, it is filtered and the excess of calcium carbonate is eliminated. After cooling, the hydrochloride of 1-N(beta-diethylamino-ethyl) nitro-3, diamino 1,4-benzene precipitates out in the form of brownish red crystals. Yield: 70%.

This hydrochloride when re-crystallized from methanol, melts with decomposition at 180–182° C.
Analysis:

| Element | Theory | Found |
|---|---|---|
| C | 49.91 | 49.19–49.45 |
| H | 7.27 | 6.95–7.29 |
| N | 19.40 | 19.29–19.49 |

*Dyeing test.*—An aqueous, 1% solution of this composition brought to pH 7 by the addition of ammonia, was applied cold to white living hair and left in contact therewith for five minutes. The hair was dyed a very deep red violine shade.

EXAMPLE 5.—1-N(BETA-DIMETHYLAMINO-ETHYL) NITRO-3 DIAMINO 1,4-BENZENE

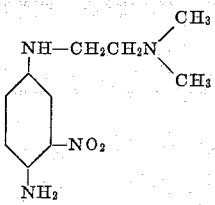

Under the same conditions as for the composition of 1-N(beta-diethylamino-ethyl) nitro-3, diamino-1,4-benzene, by condensation of hydrochloride of beta-dimethylamino-chloro-ethane on nitroparaphenylenediamine a yield of 50% chlorhydrate of 1-N(beta-dimethylamino-ethyl) nitro-3, diamino-1,4-benzene is obtained which, when recrystallized with methanol melts with decomposition at 205–208° C.
Analysis:

| Element | Theory | Found |
|---|---|---|
| C | 46.00 | 45.60–45.85 |
| H | 6.53 | 6.51–6.52 |
| N | 21.50 | 21.43–21.56 |

*Dyeing test.*—A dyeing test carried out under the same conditions as with the preceding composition yielded comparable results.

EXAMPLE 6.—1-N[(BETA - DIETHYLAMINO-ETHYL) (METHYL)] NITRO-3, DIAMINO-1,4 BENZENE

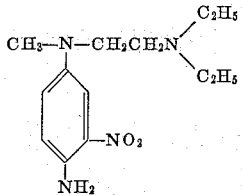

This composition is prepared from 1-N(methyl)-nitro-3-diamino-1,4, benzene by condensation with hydrochloride of beta-diethylamino-chloro-ethane in an aqueous medium in the presence of an excess of calcium carbonate by refluxing.

In a mixture of 8.35 grams (0.05 mole) of 1-N(methyl) nitro-3, diamino-1,4 benzene, 7 grams (0.07 mole) of calcium carbonate and 85 cc. of water, heated to boiling, there is added drop by drop, over a period of 35 minutes, a solution of 12.66 grams (0.07 mole) of the hydrochloride of beta-diethylamino-chloro-ethane in 35 cc. of water, to release the carbon dioxide.

After the carbon dioxide is no longer being released the mixture is filtered at its boiling temperature to eliminate the excess of calcium carbonate. Then, after cooling, the filtrate is alkalized by adding ammonia. The liberated base is extracted with ether and isolated in the usual manner in the form of an oil.

This base is then transformed into a hydrochloride by passing gaseous hydrochloric acid into the methanol solution. The precipitated hydrochloride is then filtered and vacuum dried. There is thus obtained a yield of 60% dichlorhydride of 1-N[(beta-diethyl-amino-ethyl) (methyl)]nitro-3 diamino-1,4 benzene which, when recrystallized in methanol, melts with decomposition at 162–163° C.
Analysis:

| Element | Theory | Found |
|---|---|---|
| C | 46.01 | 46.20–45.18 |
| H | 7.07 | 7.06–7.16 |
| N | 16.51 | 16.64–16.85 |

*Dyeing test.*—A 2% aqueous solution of this composition, brought to pH 7 by addition of ammonia, applied cold to white hair and left in contact therewith for 15 minutes, dyed the hair an intense violine shade.

EXAMPLE 7.—1-N(BETA-DIETHYLAMINO-ETHYL) NITRO-4 DIAMINO-1,2 BENZENE

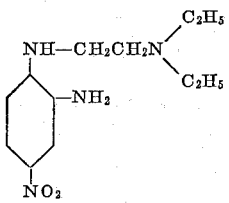

This composition is prepared by reducing with sodium sulfide in a hydro-alcohol medium (beta-diethylamino-ethyl) dinitro-2,4-aniline. The latter product is obtained in a known manner by condensing dinitro 2,4-chlorobenzene with N-N-diethyl-ethylenediamine.

To a solution of 42.5 grams (0.15 mole) of beta-diethyl-amino-ethyl-dinitro-2,4-aniline in 600 cc. in 95% ethyl alcohol at a temperature of 95° there is added, drop by drop, a solution of 21.5 grams (0.385 mole) of sodium sulfide in 600 cc. of ethyl alcohol at 95° and 48 cc. of water over a period of an hour and a half.

The alcohol is evaporated under a vacuum and the sulfide is dissolved in 209 cc. of 10% hydrochloric acid. The solution is filtered and 42.5 cc. of 20% ammonia is added at a temperature below 20° C. The pH of the solution obtained is about 7.

The monochloride precipitates and when recrystallized from alcohol melts with decomposition at 210° C. Yield: 80%.

By dissolving this hydrochloride and alkalizing it with sodium hydroxide in an aqueous solution, the corresponding base may be obtained after cooling, which base when recrystallized from benzene, melts at 62° C.

Analysis:

| Element | Calculated at $C_{12}H_{20}N_4O_2$ | Found |
| --- | --- | --- |
| C | 57.15 | 57.38–57.15 |
| H | 7.94 | 8.01–7.87 |
| N | 22.21 | 21.80–21.85 |

*Dyeing test.*—An aqueous solution of 1% hydrochloride of this composition was brought to pH 7 by adding ammonia, and applied cold to grey hair, and after a contact of 15 minutes produced a bright yellow shade.

EXAMPLE 8.—1-N-(GAMMA-DIETHYLAMINO-PROPYL) NITRO-3 DIAMINO-1,4-BENZENE

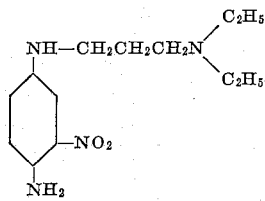

This product is prepared from nitroparaphenylene-diamine by condensation with gamma-diethyl-amino-chloro-propane in an aqueous medium, by refluxing.

A mixture of 11 grams (0.072 mole) of nitropara-phenylene-diamine, 10.75 grams (0.072 mole) of gamma-diethyl-amino-chloro-propane, and 80 cc. of water is heated by refluxing for 2 hours.

The mixture is cooled and the nitroparaphenylenediamine which has not reacted is filtered. The filtrate is made alkaline by adding an aqueous sodium hydroxide solution, and is then extracted with ether.

After conventional treatment an oil is obtained which is transformed into a hydrochloride by passing aqueous hydrochloric acid into a solution of this product in ethanol. There is thus obtained a yield of about 70% of the dichlorhydride of 1 - N(gamma - diethyl - amino - propyl) nitro-3 diamino-1,4 benzene which when recrystallized is absolute ethanol and melts with decomposition at 160° C.

Analysis:

| Element | Theory | Found |
| --- | --- | --- |
| C | 46.1 | 45.50–45.43 |
| H | 7.08 | 7.09–6.93 |
| N | 16.51 | 15.78–16.30 |

An aqueous 1% solution of the hydrochloride of said composition, brought to pH 7 by adding ammonia, is applied cold to white hair and left in contact therewith for 15 minutes and produces a violine red shade.

EXAMPLE 9.—1-N[(BETA-DIETHAMINOETHYL)(ETHYL)] NITRO-3 DIAMINO-1,4 BENZENE

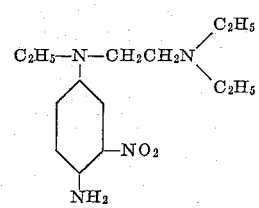

This product is prepared from 1-N(ethyl)nitro-3 diamino-1,4 benzene by condensation with beta-diethyl-amino-chloro-ethane.

In a mixture of 9.05 grams (0.05 mole) of 1-N(ethyl) nitro-3 diamino-1,4 benzene, 4 grams (0.04 mole) of calcium carbonate and 80 cc. of water, there is added, as it boils, 13.32 grams (0.077 mole) of beta-diethylamino-chloro-ethane in 35 cc. of water (duration of addition: 2 hours).

The mixture is cooled and extracted with methyisobutylketone to remove any 1-N(ethyl)nitro-3 diamino-1,4 benzene which has not been transformed. The mother liquors are then alkalized by using 40% sodium hydroxide. Extraction by ether follows, and after conventional treatment a violet oil is obtained. This product when purified by passing its methyl alcohol solution over alumina, always yields an oil after evaporation of the methyl alcohol. Yield: 75%.

Analysis:

| Element | Theory | Found |
| --- | --- | --- |
| C | 60.00 | 60.55–60.32 |
| H | 8.57 | 9.00–9.58 |
| N | 20.00 | 19.52–19.59 |

An aqueous 1% solution of 1-N[(beta-diethylamino-ethyl)(ethyl)]nitro-3 diamino-1,4 benzene, adjusted to a pH of 7, is applied cold to white hair and allowed to remain in contact therewith for a period of 15 minutes and produces a rose-beige tint.

What is claimed is:

1. A nitro-para-phenylenediamine in which the nitro group is in a meta position to one of the amino groups, and in which the amino group remote from the nitro is a group which has the formula

wherein $R_1$, $R_2$ and $R_3$ are radicals selected from the group consisting of hydrogen and alkyl radicals having from 1 to 3 carbon atoms and $m$ represents an integer from 2 to 3.

2. 1-amino-2-nitro-4-β-aminoethylamino benzene.
3. 1-N(beta-diethylaminoethyl) - 3-nitro-1,4 - diaminobenzene.
4. 1-N(beta-dimethylaminoethyl) - 3-nitro-1,4-diaminobenzene.
5. 1-N[(-beta-diethylaminoethyl)(methyl)]3-nitro-1,4-diaminobenzene.
6. 1-N(gamma-diethylaminopropyl) - 3-nitro - 1,4 - diaminobenzene.
7. 1-N[(beta - diethylaminoethyl)(ethyl)]3 - nitro-1,4-diaminobenzene.

References Cited by the Examiner
UNITED STATES PATENTS
2,750,326  6/1956  Echardt _____ 167—88

OTHER REFERENCES
Hippchen, "Berichte," vol. 80, pp. 263–273 (1947).
Hippchen, "Chemical Abstracts," vol. 42, pp. 5033–4 (1948).

CHARLES B. PARKER, *Primary Examiner.*
IRVING MARCUS, *Examiner.*